(12) United States Patent
Kuroki

(10) Patent No.: US 6,462,892 B1
(45) Date of Patent: Oct. 8, 2002

(54) LENS DRIVING APPARATUS, APPARATUS AND METHOD OF MANUFACTURING THE LENS DRIVING APPARATUS

(75) Inventor: Eiji Kuroki, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/717,341

(22) Filed: Nov. 22, 2000

(30) Foreign Application Priority Data

Nov. 22, 1999 (JP) .......................................... 11-331798

(51) Int. Cl.$^7$ ................................................ G02B 7/02
(52) U.S. Cl. ....................................... 359/813; 359/823
(58) Field of Search ................................. 359/813, 814, 359/822, 823, 824; 369/44.14, 44.15, 44.16, 247

(56) References Cited

U.S. PATENT DOCUMENTS

| | | | | |
|---|---|---|---|---|
| 4,794,581 A | * | 12/1988 | Andersen | 369/44.15 |
| 5,161,067 A | * | 11/1992 | Tomiyama et al. | 359/824 |
| 5,636,068 A | | 6/1997 | Tanaka | 359/814 |
| 5,877,904 A | | 3/1999 | Kawano et al. | 359/824 |
| 6,160,771 A | | 12/2000 | Kawano et al. | 369/44.14 |
| 6,166,867 A | * | 12/2000 | Liu et al. | 359/813 |
| 6,304,391 B1 | * | 10/2001 | Hori | 359/813 |
| 6,330,120 B1 | * | 12/2001 | Shibusaka et al. | 359/814 |
| 6,377,521 B1 | * | 4/2002 | Kijima et al. | 369/44.23 |

FOREIGN PATENT DOCUMENTS

| | | |
|---|---|---|
| EP | 0 516 390 A2 | 12/1992 |
| JP | 08 329496 | 12/1996 |
| JP | 10 312558 A | 11/1998 |
| JP | 11 232670 A | 8/1999 |

* cited by examiner

Primary Examiner—Georgia Epps
Assistant Examiner—Saeed H Seyrafi
(74) Attorney, Agent, or Firm—Sughrue Mion, PLLC

(57) ABSTRACT

A substrate (25) and a lens holder (26) for supporting an objective lens (52) of the lens driving apparatus are integrally molded by synthetic resin using a predetermined mold. In the case of the integral molding, while long lengths of projection portions (31, 32, 33, 34) are integrally molded in four corners of the substrate (25), elastic wires (27, 28, 29, 30) are buried in the rear ends (47, 48, 49, 50) of the substrate (25) and are supported. By filling gaps (39, 40, 41, 42) defined by the projection portions (31, 32, 33, 34) and the substrate (25) by this integral molding with ultraviolet cure resins (43, 44, 45, 46) to cure the resins, the elastic wires (27, 28, 29, 30) are buried in the ultraviolet cure resins (43, 44, 45, 46).

19 Claims, 9 Drawing Sheets

US 6,462,892 B1

LENS DRIVING APPARATUS, APPARATUS AND METHOD OF MANUFACTURING THE LENS DRIVING APPARATUS

BACKGROUND OF THE INVENTION

The present invention relates to a lens driving apparatus used for information recording (information writing) into an information recording medium or information reproducing (information reading) from the information recording medium, and an apparatus and method of manufacturing the lens driving apparatus.

In order to optically perform information recording or information reproducing to a disk-shaped information recording medium such as CD (Compact Disk), DVD (Digital Video Disk or Digital Versatile Disk) or MD (Mini Disk), it is necessary to accurately follow an objective lens to an information track of the information recording medium. For this purpose, a so-called pickup apparatus is provided with a lens driving apparatus for electromagnetically driving the objective lens in a focusing direction and a tracking direction to perform positioning control.

FIG. 10 is a perspective view showing a configuration of a conventional lens driving apparatus provided in a pickup apparatus. This lens driving apparatus comprises a lens holder 2 in which an objective lens 1 is mounted and a substrate 7 for cantilevering the lens holder 2 by four elastic wires 3, 4, 5, 6.

While one ends of the respective elastic wires 3, 4, 5, 6 are coupled to four corners of the lens holder 2, the other ends of the elastic wires 3, 4, 5, 6 are coupled to the substrate 7 through gaps defined by depression stepped portions 8, 9, 10, 11 provided in four corners of the substrate 7 and opposed pieces 12, 13, and further the gaps are filled with ultraviolet cure resins 14, 15, 16, 17 acting as a damping material which damps mechanical vibrations.

Further, as shown in a schematic side view of FIG. 11, a magnet 18 and yokes 19, 20 fixed in the substrate 7 and an electric circuit board 21 fixed in the lens holder 2 are provided between the lens holder 2 and the substrate 7, and a focusing coil and a tracking coil (not shown) are formed on the electric circuit board 21. Also, the electric circuit board 21 in which the focusing coil and the tracking coil are formed is provided between the yokes 19 and 20 at a certain distance.

Then, magnetic force is generated in a focusing direction $\theta_F$ by supplying a driving current to the focusing coil and focusing control is performed by finely adjusting a position of the focusing direction $\theta_F$ of the objective lens 1 and the lens holder 2 by means of this magnetic force. Also, magnetic force is generated in a tracking direction $\theta_T$ by supplying a driving current to the tracking coil and tracking control is performed by finely adjusting a position of the tracking direction $\theta_T$ of the objective lens 1 and the lens holder 2 by means of this magnetic force.

Here, the lens holder 2 is cantilevered to the substrate 7 through the four elastic wires 3, 4, 5, 6, so that the lens holder 2 becomes deformed freely in response to the magnetic force generated in the case of the focusing control and the tracking control. As a result of this, the objective lens 1 and the lens holder 2 are deviated in a desired direction with them floated and thus, information recording into an information recording medium DSC or information reproducing from the information recording medium DSC can be performed with high accuracy.

Also, the elastic wires 3, 4, 5, 6 are fixed in the substrate 7 while being buried in a state surrounded by the ultraviolet cure resins 14, 15, 16, 17 acting as a damping material, so that the ultraviolet cure resins 14, 15, 16, 17 absorb vibrations occurring in the elastic wires 3, 4, 5, 6 in the case of the focusing control and the tracking control, and it is constructed so as to achieve the focusing control and the tracking control with good responsiveness.

Incidentally, as shown in FIG. 11, the substrate 7 is mounted on a movable body 24 supported by a pair of guide shafts 22, 23 provided in a chassis of a body of an information recording and reproducing apparatus. Then, by forward or backward moving the movable body 24 along a longitudinal direction of the guide shafts 22, 23, this lens driving apparatus is forward or backward moved in a radial direction of the information recording medium DSC (the same direction as the tracking direction $\theta_T$) and further by making use in combination with the focusing control and the tracking control, it is intended to perform the information recording and information reproducing with high accuracy.

However, in the conventional lens driving apparatus described above, as shown in FIG. 10, liquid sagging occurs in case of simply filling the depression stepped portions 8, 9, 10, 11 of the substrate 7 with the ultraviolet cure resins 14, 15, 16, 17, so that the opposed pieces 12, 13 other than the substrate 7 were mounted so as to attach to the depression stepped portions 8, 9, 10, 11 and thereby the gaps capable of preventing the liquid sagging were defined and their gaps were filled with the ultraviolet cure resins 14, 15, 16, 17. Because of this, there were problems that the number of manufacturing steps increases while the number of parts increases. These problems will be described in detail with reference to FIGS. 12 and 13 below.

First, as shown in an exploded perspective view of FIG. 12, the substrate 7 and the opposed pieces 12, 13 are respectively molded by individual members. Depression stepped portions 7c, 7d, 7e, 7f for inserting the elastic wires 3, 4, 5, 6 are molded in the four corners of the substrate 7, and fitting protrusions 7g, 7h are formed on the side end of a T-shaped projection 7b of the side of the depression stepped portions 7e, 7f and fitting protrusions (not shown) similar to the fitting protrusions 7g, 7h are formed on the side end of a T-shaped projection 7a of the side of the depression stepped portions 7c, 7d.

A through hole 13a for fitting the fitting protrusions 7g, 7h is formed in the opposed piece 13 and a through hole 12a similar to the through hole 13a is formed in the opposed piece 12.

Next, as shown in a plan view of FIG. 13, after inserting the elastic wires 3, 4, 5, 6 into the depression stepped portions 7c, 7d, 7e, 7f, the elastic wires 3, 4, 5, 6 were supported in the substrate 7 by fixing respective rear ends of the elastic wires 3, 4, 5, 6 with adhesive and then, the opposed pieces 12, 13 were fitted to the projections 7a, 7b and the gaps defined thereby were filled with the liquid ultraviolet cure resins 14, 15, 16, 17 and the resins were cured.

In this manner, the opposed pieces 12, 13 were mounted in order to prevent the ultraviolet cure resins 14, 15, 16, 17 from flowing out of the depression stepped portions 7c, 7d, 7e, 7f in a state of liquid, so that there were problems that the number of manufacturing steps increases while the number of parts increases.

SUMMARY OF THE INVENTION

The invention is implemented to overcome the problems of the conventional art, and it is an object of the invention to provide a lens driving apparatus, an apparatus and method of manufacturing the lens driving apparatus capable of reducing the number of parts and simplifying manufacturing steps.

In order to achieve the object, a lens driving apparatus of the invention is characterized in that the lens driving apparatus has a lens holder for holding an objective lens, and a substrate which supports the lens holder through elastic members and is molded with resin, and the elastic members are integrally supported in the substrate in the case of the resin molding and are provided within gaps molded in the substrate with the gaps ranging to the integrally supported portions and are buried in a damping material with which the gaps are filled.

Also, the lens driving apparatus is characterized in that the gaps are formed by depression portions and projection portions opposed one another molded in the proximity of the elastic members in the case of the resin molding.

Further, the lens driving apparatus is characterized in that the depression portions and projection portions are molded in a long shape along a longitudinal direction of the elastic members.

According to the lens driving apparatus of such a construction, while the substrate is integrally molded by the resin molding, the elastic members are also integrally supported in the substrate. Further, the elastic members are provided within the gaps integrally molded in the substrate by the resin molding and also are buried with the elastic members surrounded by the damping material with which the gaps are filled. Thus, the lens driving apparatus manufactured while reducing the number of parts and the number of manufacturing steps can be provided. In addition, the lens driving apparatus without liquid sagging of the damping material can be provided by filling the gaps within which the elastic members are provided with the damping material. For example, the lens driving apparatus without the liquid sagging can be provided even when using ultraviolet cure resin as the damping material.

Also, a lens driving apparatus of the invention is characterized in that the lens driving apparatus has a lens holder which holds an objective lens and is molded with resin, and a substrate for supporting the lens holder through elastic members, and the elastic members are integrally supported in the lens holder in the case of the resin molding and are provided within gaps molded in the lens holder with the gaps ranging to the integrally supported portions and are buried in a damping material with which the gaps are filled.

Also, the lens driving apparatus is characterized in that the gaps are formed by depression portions and projection portions opposed one another molded in the proximity of the elastic members in the case of the resin molding.

Further, the lens driving apparatus is characterized in that the depression portions and projection portions are molded in a long shape along a longitudinal direction of the elastic members.

According to the lens driving apparatus of such a construction, while the lens holder is integrally molded by the resin molding, the elastic members are also integrally supported in the lens holder. Further, the elastic members are provided within the gaps integrally molded in the lens holder by the resin molding and also are buried with the elastic members surrounded by the damping material with which the gaps are filled. Thus, the lens driving apparatus manufactured while reducing the number of parts and the number of manufacturing steps can be provided. In addition, the lens driving apparatus without liquid sagging of the damping material can be provided by filling the gaps within which the elastic members are provided with the damping material. For example, the lens driving apparatus without the liquid sagging can be provided even when using ultraviolet cure resin as the damping material.

A manufacturing apparatus of a lens driving apparatus of the invention is characterized in that there is the manufacturing apparatus of the lens driving apparatus having a lens holder for holding an objective lens, and a substrate for supporting the lens holder through elastic members, and the manufacturing apparatus comprises a mold on which cavities having a first depression for molding a base of the substrate, a projection adjacent to the first depression, and a second depression adjacent to the projection and partially ranging to the first depression are formed, and by filling the cavities of the mold with synthetic resin with the elastic members stretched between the projection of the mold and the ranging portion of the first and second depressions, the elastic members are supported in the base molded by the synthetic resin with which the ranging portion is filled and are provided within gaps formed by the projection and thereafter are buried in a damping material by filling the gaps with the damping material.

Also, a manufacturing apparatus of a lens driving apparatus is characterized in that there is the manufacturing apparatus of the lens driving apparatus having a lens holder for holding an objective lens, and a substrate for supporting the lens holder through elastic members, and the manufacturing apparatus comprises a mold on which cavities having a first depression for molding a base of the lens holder, a projection adjacent to the first depression, and a second depression adjacent to the projection and partially ranging to the first depression are formed, and by filling the cavities of the mold with synthetic resin with the elastic members stretched between the projection of the mold and the ranging portion of the first and second depressions, the elastic members are supported in the base molded by the synthetic resin with which the ranging portion is filled and are provided within gaps formed by the projection and thereafter are buried in a damping material by filling the gaps with the damping material.

According to the manufacturing apparatus of the lens driving apparatus, while the substrate or the lens holder is integrally molded by the resin molding, the elastic members are also integrally supported in the substrate or the lens holder. Further, the elastic members are provided within the respective gaps integrally molded in the substrate or the lens holder by the resin molding and also are buried with the elastic members surrounded by the damping material with which the gaps are filled. Thus, the lens driving apparatus manufactured while reducing the number of parts and the number of manufacturing steps can be provided. In addition, the lens driving apparatus without liquid sagging of the damping material can be provided by filling the gaps within which the elastic members are provided with the damping material. For example, the lens driving apparatus without the liquid sagging can be provided even when using ultraviolet cure resin as the damping material.

A manufacturing method of a lens driving apparatus of the invention is characterized in that there is the manufacturing method of the lens driving apparatus having a lens holder for holding an objective lens, and a substrate for supporting the lens holder through elastic members, and the manufacturing method comprises a first step of fitting the elastic members into a mold on which cavities having a first depression for molding a base of the substrate, a projection adjacent to the first depression, and a second depression adjacent to the projection and partially ranging to the first depression are formed with the elastic members stretched between the projection and the ranging portion of the first and second depressions, a second step of integrally supporting the elastic members in the base molded by the synthetic resin with which the ranging portion is filled and providing the elastic members within gaps formed by the projection between the first and second depressions by filling the cavities of the mold with synthetic resin, and a third step of burying the elastic members in a damping material by filling the gaps with the damping material after separating the mold.

Also, a manufacturing method of a lens driving apparatus is characterized in that there is the manufacturing method of the lens driving apparatus having a lens holder for holding an objective lens, and a substrate for supporting the lens holder through elastic members, and the manufacturing method comprises a first step of fitting the elastic members into a mold on which cavities having a first depression for molding a base of the lens holder, a projection adjacent to the first depression, and a second depression adjacent to the projection and partially ranging to the first depression are formed with the elastic members stretched between the projection and the ranging portion of the first and second depressions, a second step of integrally supporting the elastic members in the base molded by the synthetic resin with which the ranging portion is filled and providing the elastic members within gaps formed by the projection between the first and second depressions by filling the cavities of the mold with synthetic resin, and a third step of burying the elastic members in a damping material by filling the gaps with the damping material after separating the mold.

According to the manufacturing method of the lens driving apparatus, while the substrate or the lens holder is integrally molded by the resin molding, the elastic members are also integrally supported in the substrate or the lens holder. Further, the elastic members are provided within the respective gaps integrally molded in the substrate or the lens holder by the resin molding and also are buried with the elastic members surrounded by the damping material with which the gaps are filled. Thus, the lens driving apparatus manufactured while reducing the number of parts and the number of manufacturing steps can be provided. In addition, the lens driving apparatus without liquid sagging of the damping material can be provided by filling the gaps within which the elastic members are provided with the damping material. For example, the lens driving apparatus without the liquid sagging can be provided even when using ultraviolet cure resin as the damping material.

DETAILED DESCRIPTION OF THE PREFERRED EMBODIMENTS

Figure 1:
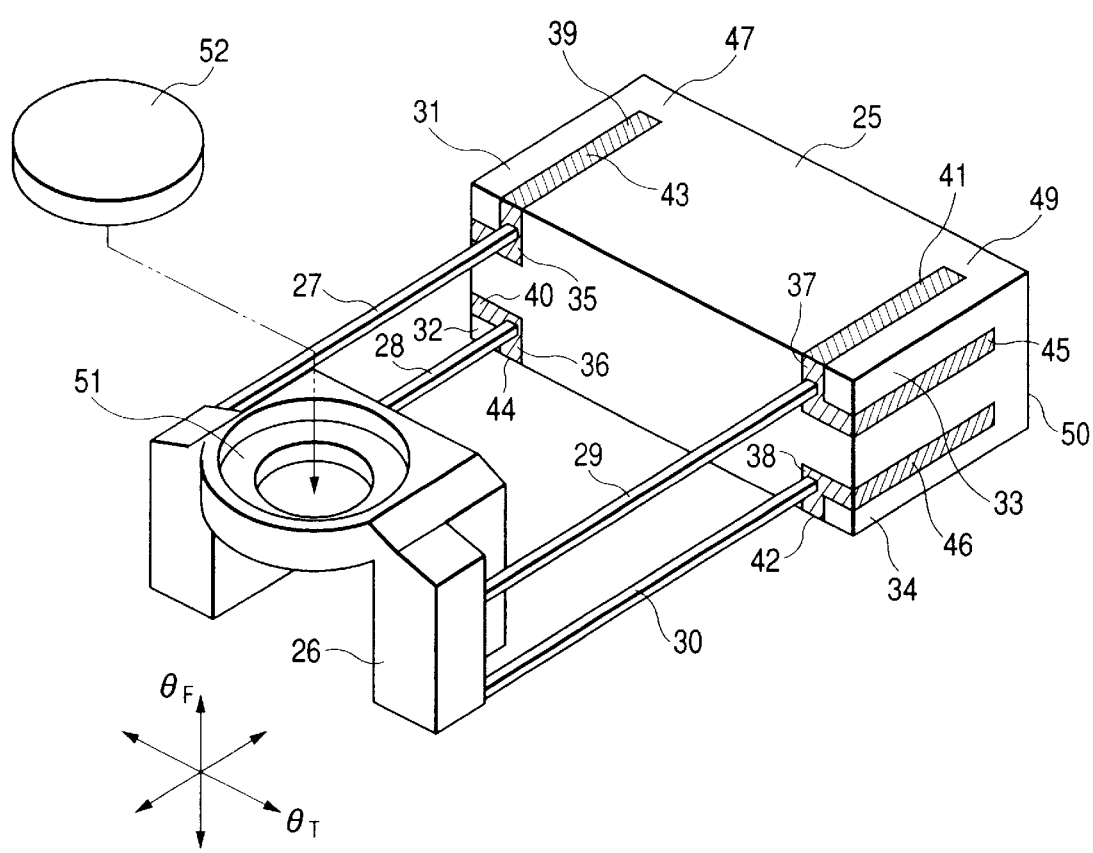
FIG. 1 is a perspective view showing a configuration of a lens driving apparatus of the present embodiment.
Figure 2:
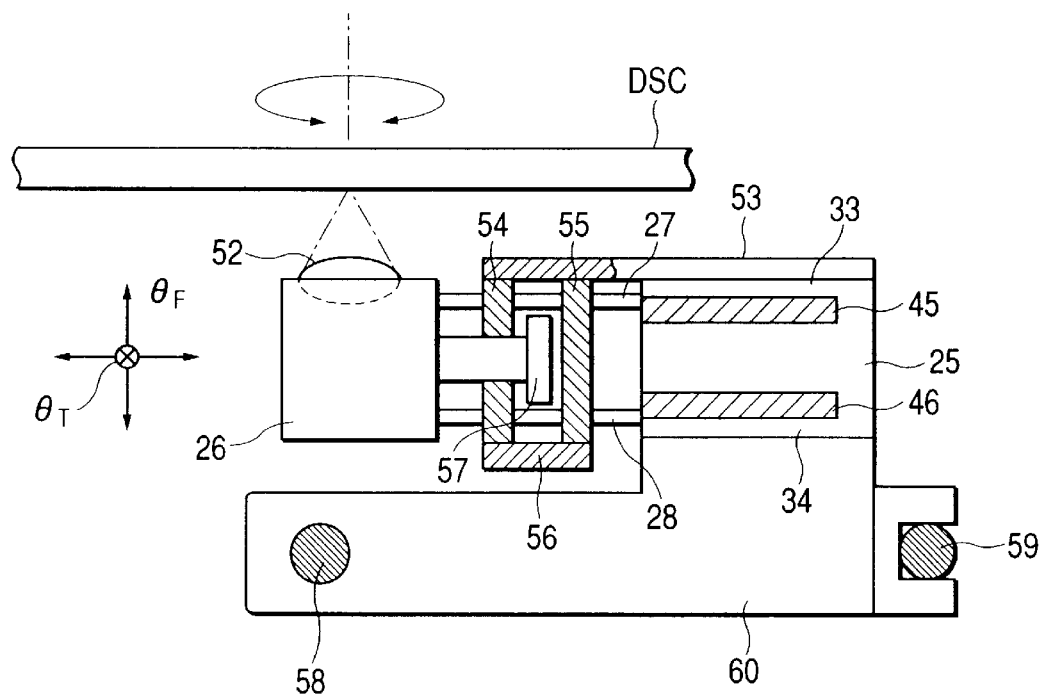
FIG. 2 is a side view schematically showing a side shape of the lens driving apparatus.

An embodiment of the invention will be described with reference to the accompanying drawings below. FIG. 1 is a perspective view showing an external configuration of a lens driving apparatus according to the embodiment, and FIG. 2 is a side view schematically showing a side shape of the lens driving apparatus.

First, a configuration of the lens driving apparatus will be described. In FIG. 1, the lens driving apparatus is an apparatus applied to an information recording and reproducing apparatus such as CD players, DVD players or MD players, and comprises a substrate 25 and a lens holder 26 molded with synthetic resin and four elastic members (hereinafter called elastic wires) 27, 28, 29, 30 coupled between the substrate 25 and the lens holder 26.

Long lengths of projection portions 31, 32, 33, 34 extending to the side of the lens holder 26 and depression stepped portions 35, 36, 37, 38 are integrally molded with them opposed respectively in four corners of the substrate 25.

The elastic wires 27, 28, 29, 30 are fixed in the rear ends 47, 48, 49, 50 of the substrate 25 with the elastic wires interposed into L-shaped gaps 39, 40, 41, 42 respectively defined by the projection portions 31, 32, 33, 34 and the depression stepped portions 35, 36, 37, 38 (with the elastic wires in no contact with the projection portions 31, 32, 33, 34 and the depression stepped portions 35, 36, 37, 38), and further the gaps 39, 40, 41, 42 are filled with ultraviolet cure resins 43, 44, 45, 46 acting as a damping material. That is, the elastic wires 27, 28, 29, 30 are supported in the rear ends 47, 48, 49, 50 with the elastic wires surrounded by the ultraviolet cure resins 43, 44, 45, 46.

Incidentally, for convenience of description, the rear end 48 is not drawn in FIG. 1, but the rear end 48 is located in the lower side of the rear end 47 in a manner similar to the rear end 50 located in the lower side of the rear end 49.

On the contrary, integral coupling is performed by burying respective other ends of the elastic wires 27, 28, 29, 30 in four corners of the lens holder 26, and an objective lens 52 is provided in a lens mounting portion 51 formed in the center portion of the lens holder 26.

Further, as shown in FIG. 2, magnetic circuit unit (omission of reference sign) for performing focusing control and tracking control is provided within a gap among the lens holder 26, the substrate 25 and the elastic wires 27, 28, 29, 30.

This magnetic circuit unit comprises yokes 54, 55 suspended and fixed in a supporting member 53 fixed on the top of the substrate 25, a magnet 56 fastened in the bottom of the yokes 54, 55, and an electric circuit board 57 provided between the yokes 54, 55 and fixed in one end of the lens holder 26.

Figure 3:
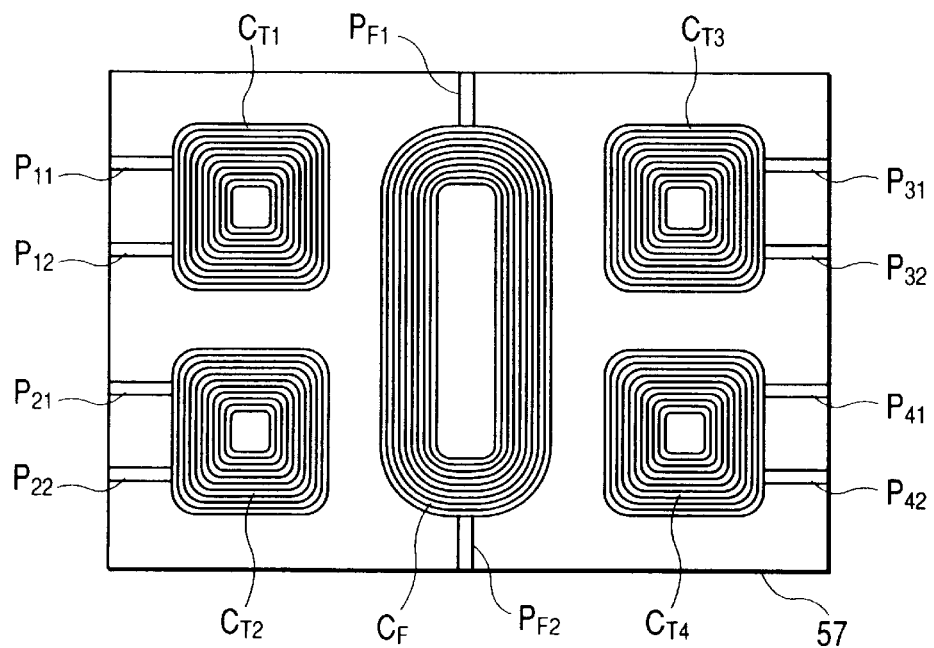
FIG. 3 is a plan view showing a pattern shape of a focusing coil and a tracking coil formed on an electric circuit board.

Here, a focusing coil $C_F$ and four sets of tracking coils $C_{T1}$, $C_{T2}$, $C_{T3}$, $C_{T4}$ as shown in FIG. 3 are patterned on the surface of the electric circuit board 57 by metal deposition or etching process, and the electric circuit board 57 is provided with the focusing coil $C_F$ and the tracking coils $C_{T1}$, $C_{T2}$, $C_{T3}$, $C_{T4}$ directed to the yokes 54, 55.

Then, magnetic force is generated in a focusing direction $\theta_F$ by supplying a driving current for focusing control through electrodes $P_{F1}$, $P_{F2}$ provided in both ends of the focusing coil $C_F$ and focusing control is performed by finely adjusting a position of the focusing direction $\theta_F$ of the objective lens 52 and the lens holder 26 by means of this magnetic force.

Also, magnetic force is generated in a tracking direction $\theta_T$ by supplying a driving current for tracking control to each electrode $P_{11}$, $P_{12}$, $P_{21}$, $P_{22}$, $P_{31}$, $P_{32}$, $P_{41}$, $P_{42}$ provided in the tracking coils $C_{T1}$, $C_{T2}$, $C_{T3}$, $C_{T4}$ and tracking control is performed by finely adjusting a position of the tracking direction $\theta_T$ of the objective lens 52 and the lens holder 26 by means of this magnetic force.

Further, the lens holder 26 is cantilevered to the substrate 25 through the four elastic wires 27, 28, 29, 30, so that the lens holder 26 becomes deformed freely in response to the magnetic force generated in the case of the focusing control and the tracking control. As a result of this, the objective lens 52 and the lens holder 26 are deviated in a desired direction with them floated and thus, information recording into an information recording medium DSC or information reproducing from the information recording medium DSC can be performed with high accuracy. Furthermore, the elastic wires 27, 28, 29, 30 are provided in a state surrounded by the ultraviolet cure resins 43, 44, 45, 46 acting as a damping material, so that the ultraviolet cure resins 43, 44, 45, 46 absorb vibrations occurring in the elastic wires 27, 28, 29, 30 in the case of the focusing control and the tracking control, and it is constructed so as to achieve the focusing control and the tracking control with good responsiveness.

Moreover, as shown in FIG. 2, the substrate 25 is mounted on a movable body 60 supported by a pair of guide shafts 58, 59 provided in a chassis of a body of the information recording and reproducing apparatus such as CD players, DVD players or MD players. Then, by forward or backward moving the movable body 60 along a longitudinal direction (a vertical direction relative to the paper face) of the guide shafts 58, 59, this lens driving apparatus is forward or backward moved in a radial direction of the information recording medium DSC (the same direction as the tracking direction $\theta_T$) and further by the focusing control and the tracking control, the information recording and information reproducing with high accuracy can be performed.

Figure 8A:
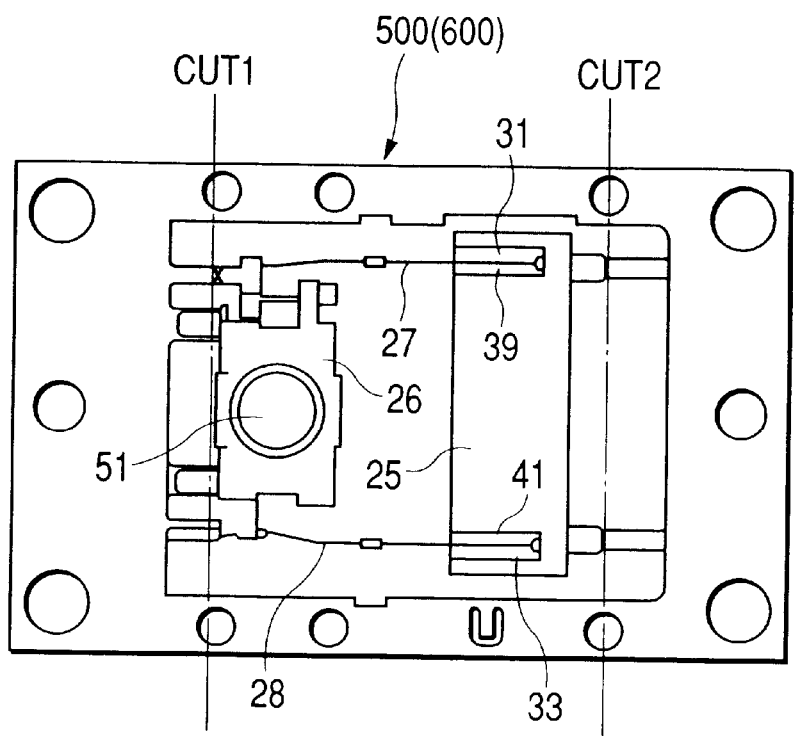
FIGS. 8A and 8B are plan views showing a state integrally molding a lens holder and a substrate with the lead frame.
Figure 8B:
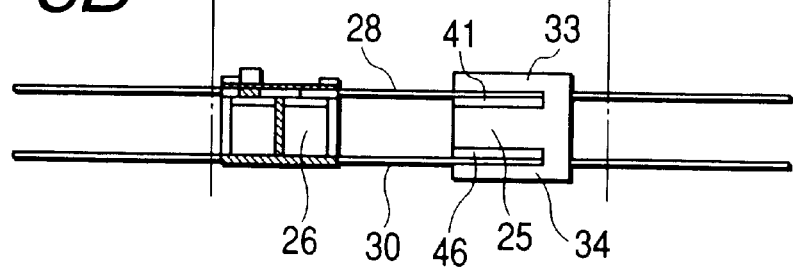
Figure 9A:
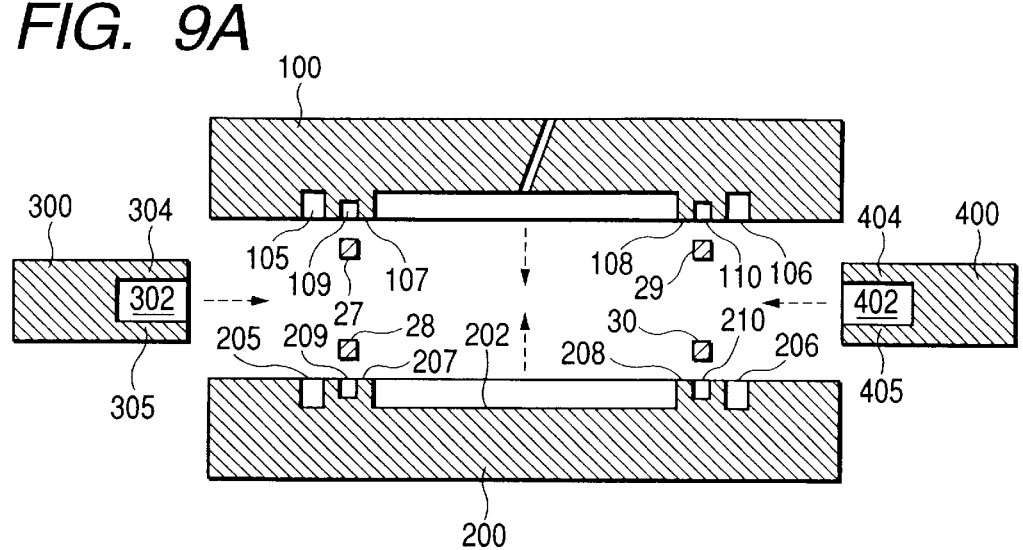
FIGS. 9A to 9C are vertical sectional views illustrating a manufacturing method for molding the substrate with resin.
Figure 9B:
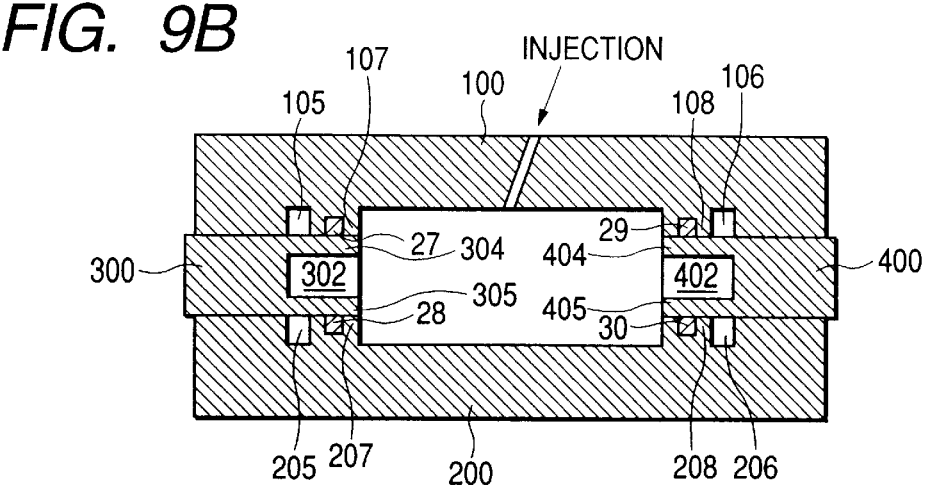
Figure 9C:
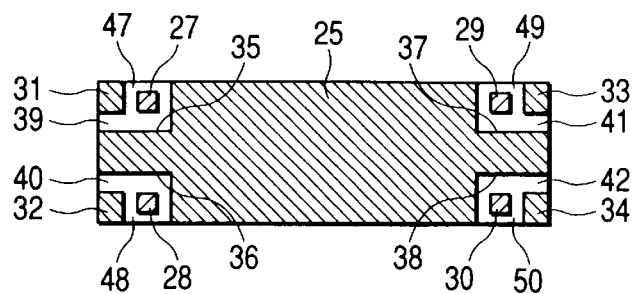
Figure 10:
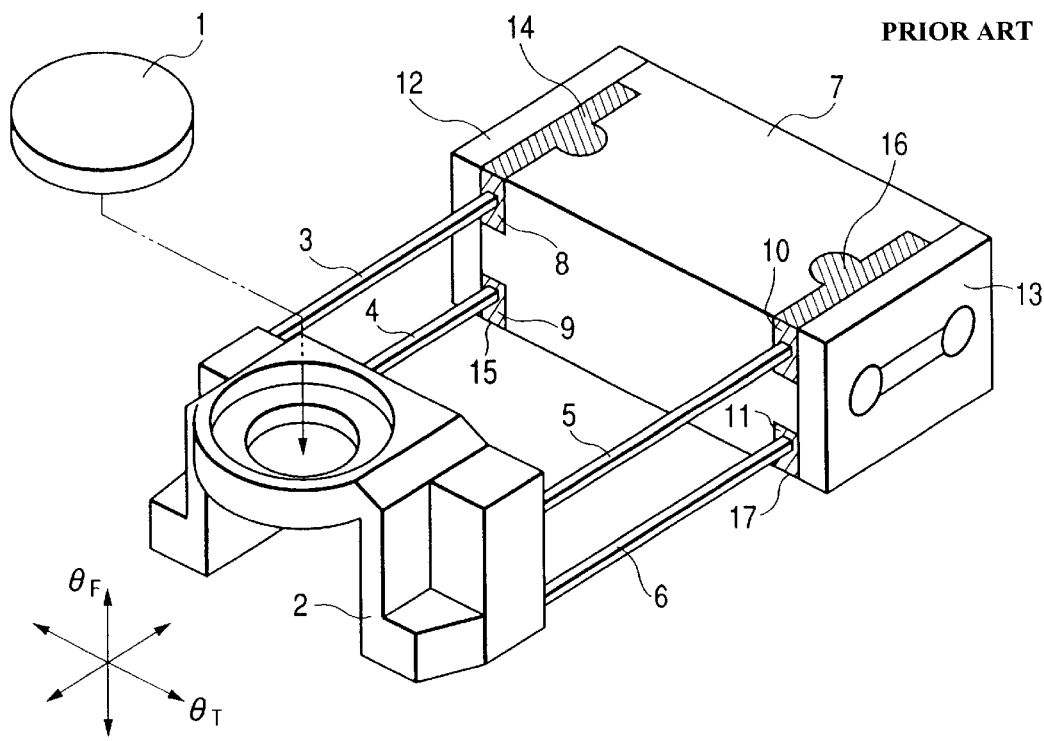
FIG. 10 is a perspective view showing a configuration of a conventional lens driving apparatus.
Figure 11:
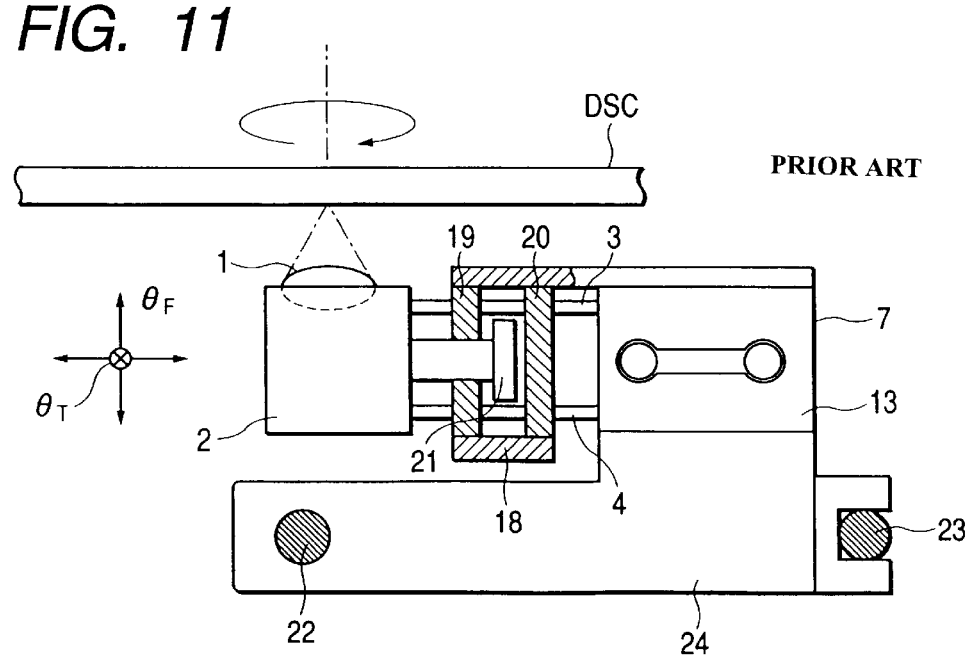
FIG. 11 is a side view schematically showing a side shape of the conventional lens driving apparatus.
Figure 12:
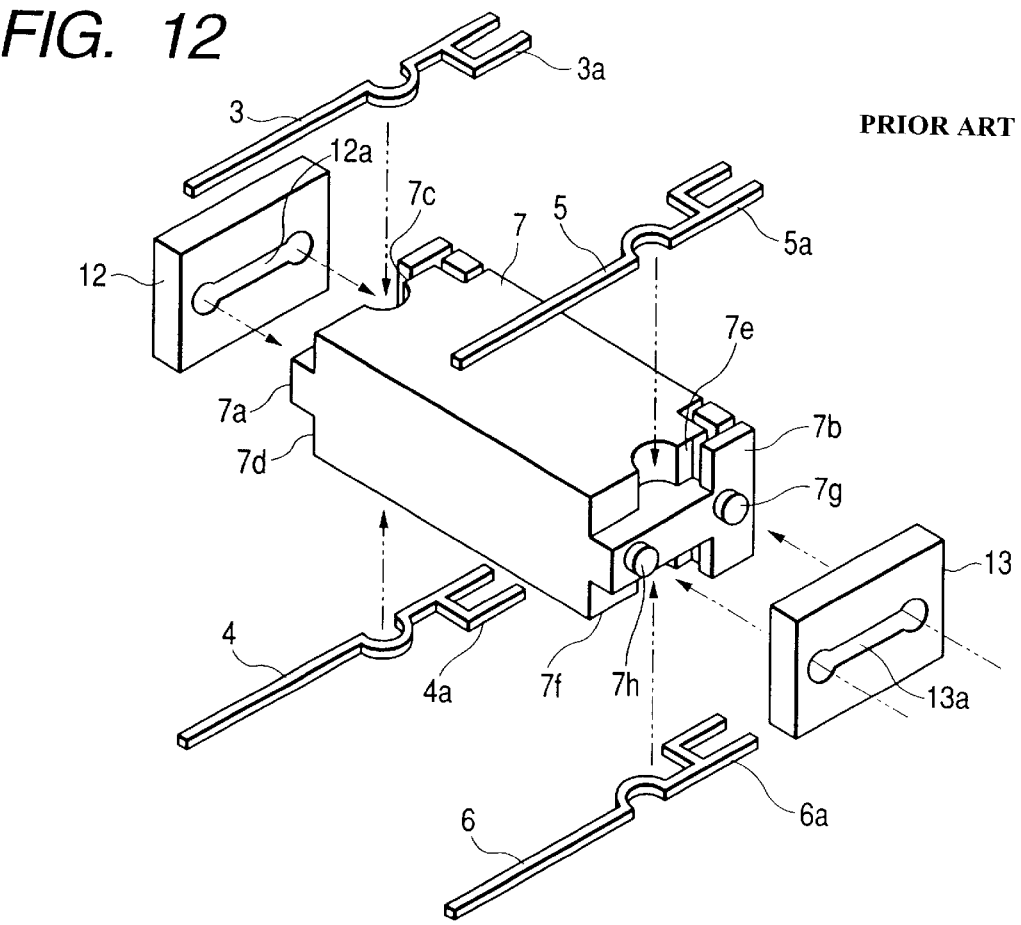
FIG. 12 is an exploded perspective view showing a manufacturing process of the conventional lens driving apparatus.
Figure 13:
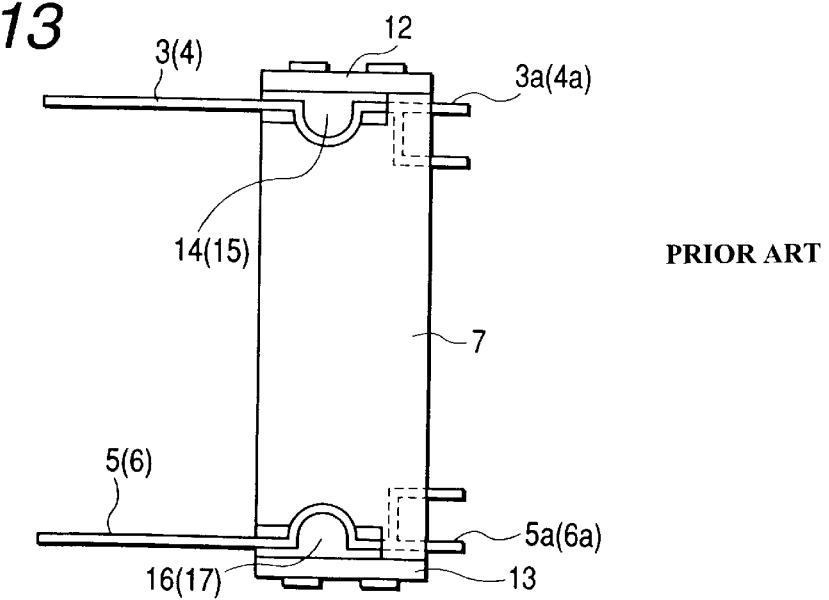
FIG. 13 is a plan view showing a mounting structure of the substrate and elastic wires in the conventional lens driving apparatus.

Next, an apparatus of manufacturing the lens driving apparatus and a method of manufacturing the lens driving apparatus will be described with reference to FIGS. 4 to 9. Also, FIG. 4 is a perspective view showing a structure of a mold provided in the manufacturing apparatus, and FIG. 5 is a perspective view showing a shape of a lead frame, and FIGS. 6 and 7 are plan views showing a shape of the lead frame, and FIGS. 8A and 8B are illustrations showing a state molding the lens driving apparatus with the lead frame, and FIGS. 9A to 9C are sectional views illustrating operations of the manufacturing apparatus.

Figure 4:
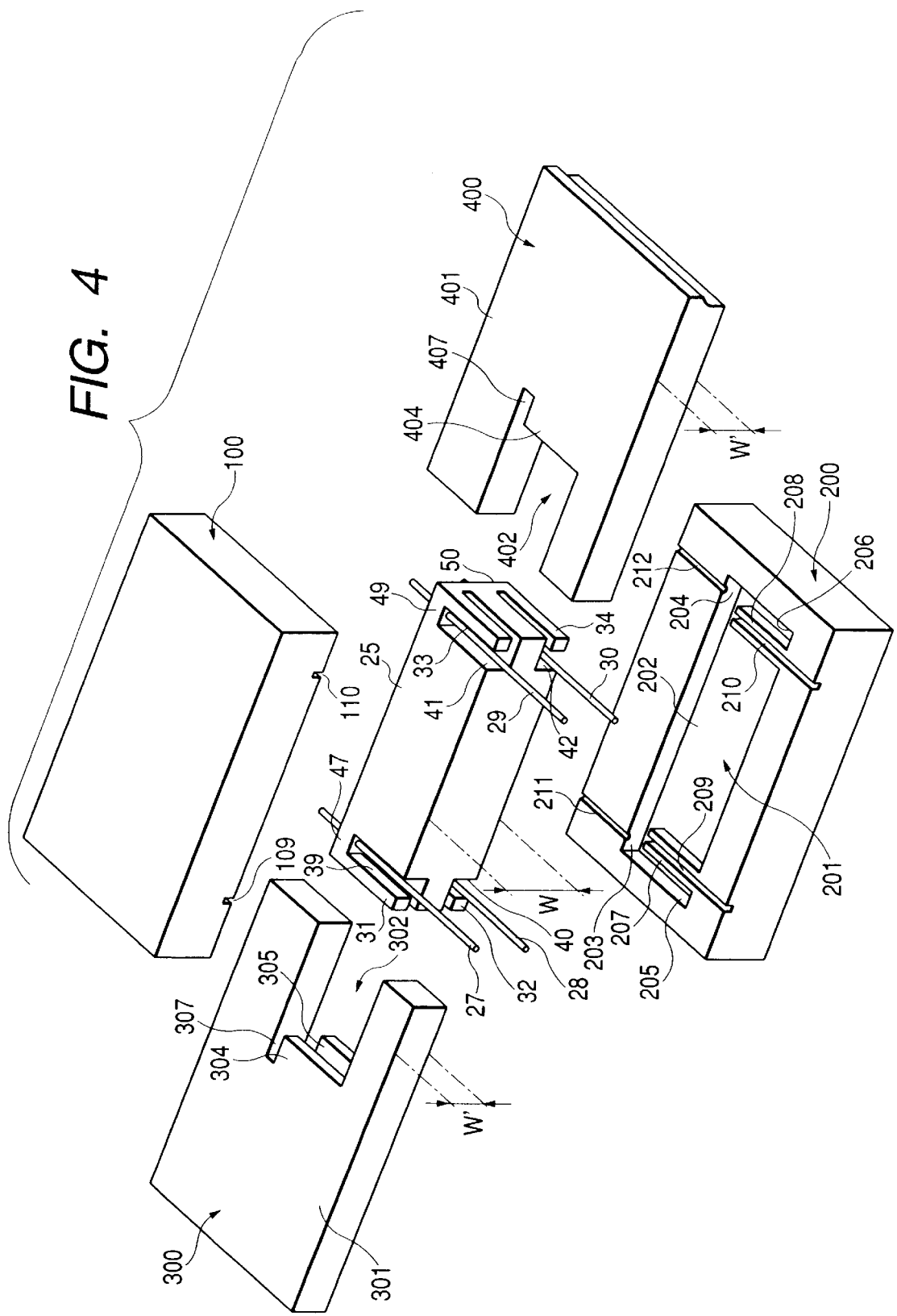
FIG. 4 is a perspective view showing a structure of a mold for molding the lens driving apparatus with resin.

In FIG. 4, the manufacturing apparatus is provided with a mold comprising a top movable mold 100, a bottom movable mold 200, a left movable mold 300 and a right movable mold 400. As further shown in FIG. 5, a pair of metal lead frames 500, 600 punched are transferred to a predetermined direction Z while maintaining a predetermined distance, and it is intended to mold the substrate 25 with resin relative to the metal lead frames 500, 600 by the movable molds 100, 200, 300, 400 disposed perpendicularly to the transfer direction Z.

Figure 5:
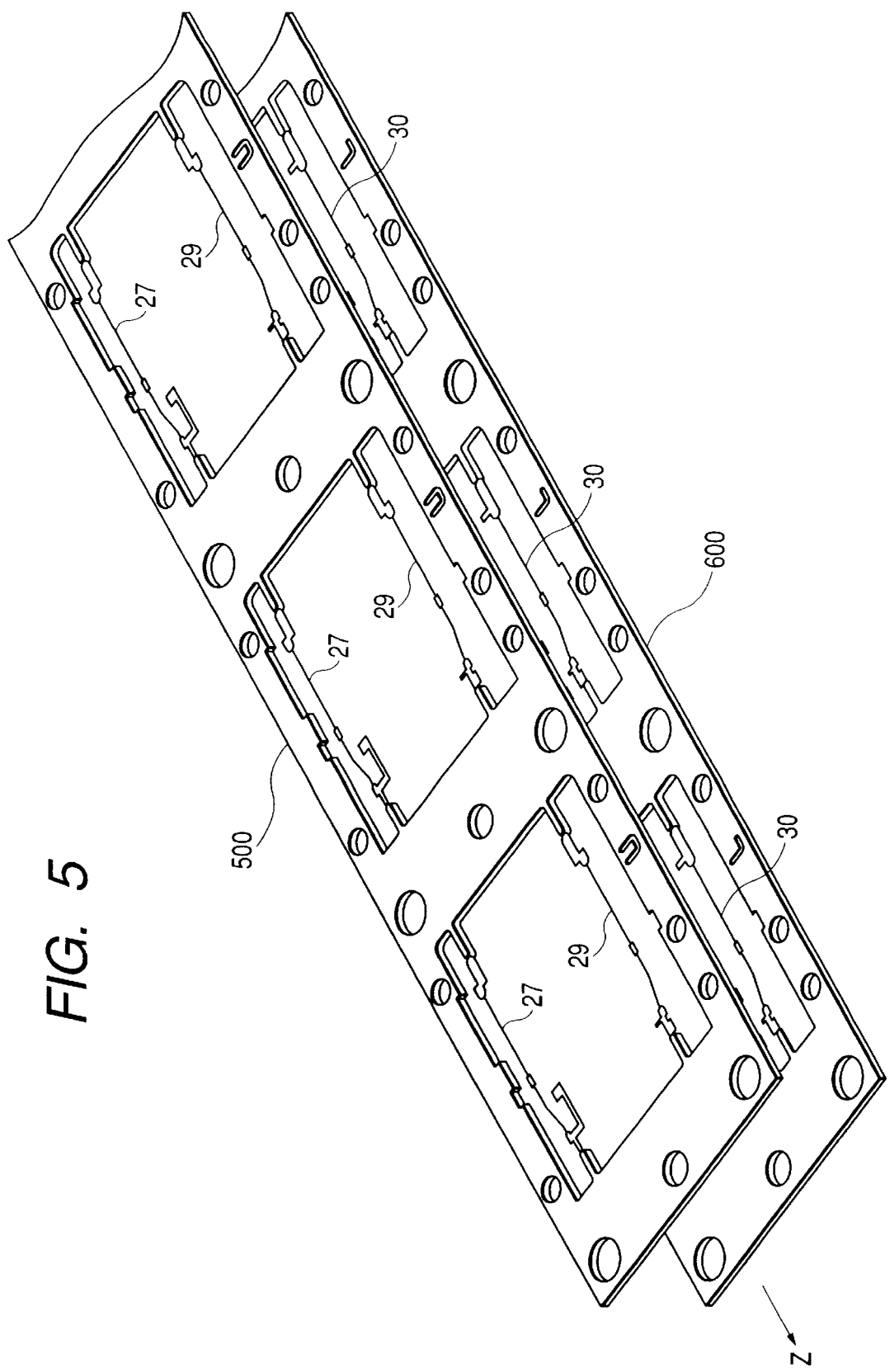
FIG. 5 is a perspective view showing a shape of a lead frame for manufacturing the lens driving apparatus.
Figure 6:
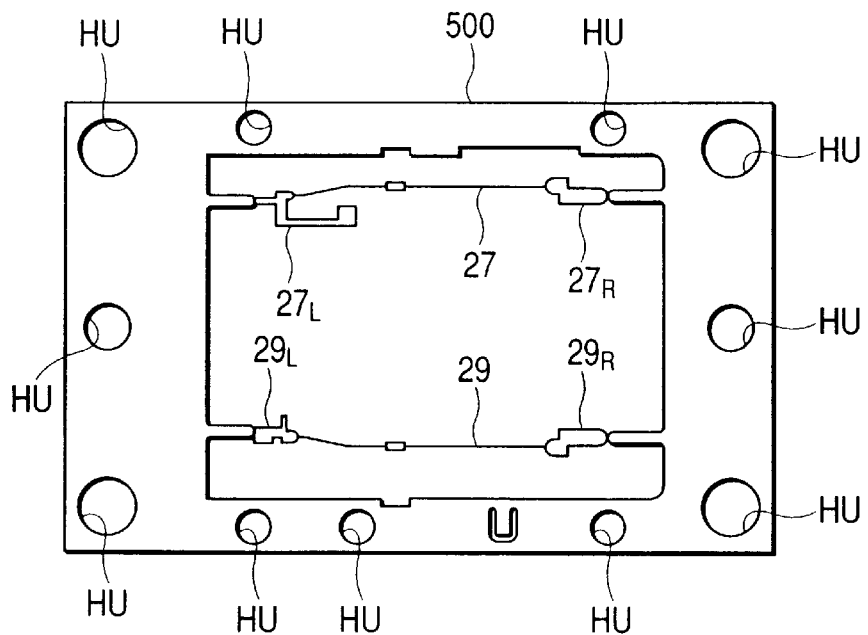
FIG. 6 is a plan view further showing a shape of the lead frame for manufacturing the lens driving apparatus.

As shown in FIG. 6, elastic wires 27, 29, supporting portions $27_L$, $27_R$, $29_L$, $29_R$ for molding the lens holder 26 and the substrate 25 with resin in both ends (left and right sides in the drawing) of these elastic wires 27, 29, and a plurality of positioning holes HU for positioning the top movable mold 100 are previously formed in the metal lead frame 500 by punching. Further, the belt-shaped metal lead frame 500 shown in FIG. 5 is formed by continuously performing the punching corresponding to one lens driving apparatus in a longitudinal direction of the metal lead frame 500.

Figure 7:
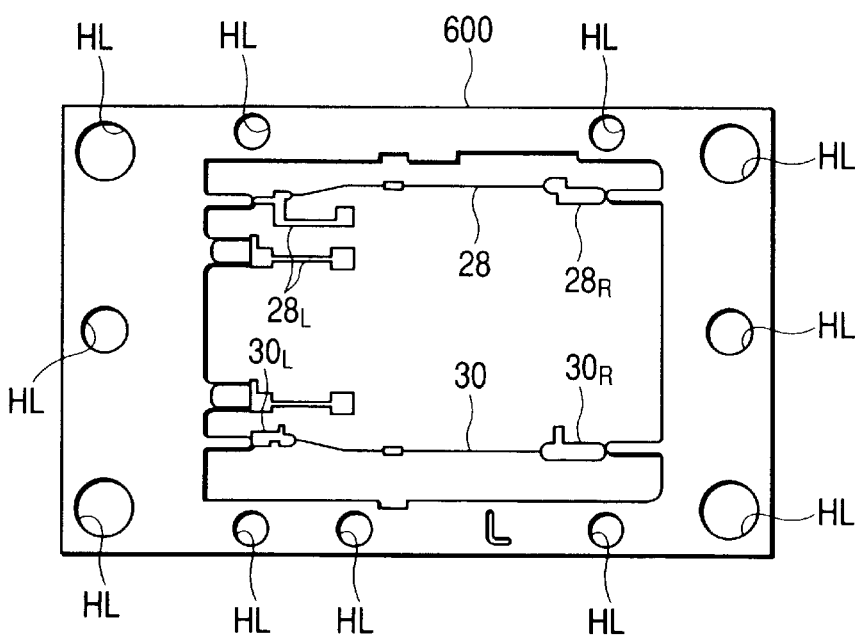
FIG. 7 is a plan view further showing a shape of the lead frame for manufacturing the lens driving apparatus.

As shown in FIG. 7, elastic wires 28, 30, supporting portions $28_L$, $28_R$, $30_L$, $30_R$ for molding the lens holder 26 and the substrate 25 with resin in both ends (left and right sides in the drawing) of these elastic wires 28, 30, and a plurality of positioning holes HL for positioning the bottom movable mold 200 are also previously formed in the metal lead frame 600 by punching, and the belt-shaped metal lead frame 600 shown in FIG. 5 is formed by continuously performing the punching corresponding to one lens driving apparatus in a longitudinal direction of the metal lead frame 600.

These metal lead frames 500, 600 are transferred to the transfer direction Z while maintaining the lead frames in parallel at a constant opposed distance, and the substrate 25 is molded with resin by the movable molds 100, 200, 300, 400 at predetermined timing.

Then, after molding the substrate 25 with resin, the substrate 25 is removed from the movable molds 100, 200, 300, 400, as shown in a plan view of FIG. 8A and a side view of FIG. 8B, the lead frames 500, 600 of both sides of the substrate 25 and the lens holder 26 are cut along virtual lines CUT1, CUT2 and unnecessary portions of the lead frames 500, 600 are eliminated and thereby, an intermediate product of the lens driving apparatus is manufactured. Further, it is intended to complete the lens driving apparatus by mounting the magnetic circuit unit (see FIG. 2) while mounting the objective lens 52 (see FIG. 1) in the lens mounting portion 51 of the lens holder 26.

Incidentally, it is intended to mold the lens holder 26 with resin by a mold in a manner similar to the substrate 25, but a description about a structure of the mold will be omitted here.

Next, structures of each movable mold 100, 200, 300, 400 will be described with reference to FIG. 4. Cavities with the substantially same shape are formed on opposed surfaces of the top movable mold 100 and the bottom movable mold 200.

Referring typically to a structure of a cavity 201 of the bottom movable mold 200, an approximately rectangular depression 202 for forming a body portion of the substrate 25, depressions 203, 204 ranging to the rear side of the depression 202, and depressions 205, 206 ranging to the depressions 203, 204 and extending to the front side (the side of the lens holder 26) are formed.

Slit grooves 209, 210 extending from the front end of the bottom movable mold 200 to the depressions 203, 204 are formed on respective top surfaces of long lengths of projections (hereinafter called line projection) 207, 208 between the depression 202 and the depressions 205, 206. .Further, slit grooves 211, 212 extending to the slit grooves 209, 210 are provided extending to the rear end of the bottom movable mold 200 through the depressions 203, 204.

The slit grooves 209, 211 are provided for fitting the elastic wire 28 formed in the lead frame 600 by punching, and the slit grooves 210, 212 are provided for fitting the elastic wire 30 formed in the lead frame 600 by punching, and the depressions 202, 203, 204, 205, 206 are provided for being filled with synthetic resin.

Incidentally, only a part of slit grooves 109, 110 (corresponding to the slit grooves 209, 210) formed on the top movable mold 100 is shown in FIG. 4, but the top movable mold 100 also has a structure similar to that of the bottom movable mold 200.

Next, the left movable mold 300 and the right movable mold 400 have a symmetrical structure, respectively. These left and right movable molds 300, 400, respectively, have body portions 301, 401 with the approximately same thickness W' as a thickness W of the substrate 25, and rectangular depressions 302, 402 for defining a depth and a width of the substrate 25 are formed in the top portions of the body portions 301, 401.

Further, plate-shaped rectangular regulating projections 304, 305 opposed each other are formed in a deep portion of the depression 302 of the left movable mold 300, and a rectangular notch 307 is formed in the rear end of the regulating projections 304, 305.

Also, plate-shaped rectangular regulating projections 404, 405 opposed each other are formed in a deep portion of the depression 402 of the right movable mold 400, and a rectangular notch 407 is formed in the rear end of the regulating projections 404, 405. Incidentally, for convenience of description, the regulating projection 405 is not shown, but the regulating projection 405 is provided below the regulating projection 404 with them opposed.

Next, a method of manufacturing the lens driving apparatus using these movable molds 100, 200, 300, 400 will be described with reference to FIGS. 9A to 9C.

Incidentally, FIGS. 9A and 9B are vertical sectional views of the movable molds 100, 200, 300, 400 shown in FIG. 1 and indicate cross sections taken on a virtual plane perpendicular to the line projections 209, 210 of the bottom movable mold 200. Also, FIG. 9C indicates a cross section of the substrate 25 in the virtual plane.

First, as described above, the lead frames 500, 600 are transferred in the transfer direction Z and are transferred to a position where the elastic wires 27, 28, 29, 30 formed in the lead frames 500, 600 oppose the movable molds 100, 200, 300, 400. Thus, as shown in FIG. 9A, the elastic wires 27, 29 become opposed to the slit grooves 109, 110 of the top movable mold 100, and the elastic wires 28, 30 become opposed to the slit grooves 209, 210 of the bottom movable mold 200, respectively.

Next, as shown in FIG. 9B, the left movable mold 300 and the right movable mold. 400 are inserted to a predetermined position between the lead frames 500, 600, and further the top movable mold 100 and the bottom movable mold 200 are moved to a predetermined position of the side of the lead frames 500, 600 and thereby, these movable molds 100, 200, 300, 400 are combined.

Thus, the elastic wires 27, 29 are fitted into the slit grooves 109, 110 of the top movable mold 100, and the elastic wires 28, 30 are fitted into the slit grooves 209, 210 of the bottom movable mold 200.

Further, the regulating projections 304, 305, 404, 405 of the left and right movable molds 300, 400 are inserted to a position of the edges of the depression 102 of the top movable mold 100 and the depression 202 of the bottom movable mold 200. As a result of this, it becomes a state that the regulating projection 304 blocks the depression 105 of the top movable mold 100 and the depression 107 into which the elastic wire 27 is fitted, and the regulating projection 305 blocks the depression 205 of the bottom movable mold 200 and the depression 207 into which the elastic wire 28 is fitted, and the regulating projection 404 blocks the depression 106 of the top movable mold 100 and the depression 210 into which the elastic wire 30 is fitted.

Then, synthetic resin is injected from a synthetic resin injection hole (omission of reference sign) provided in a predetermined portion of the top movable mold 100, and the cavities formed by the movable molds 100, 200, 300, 400 are filled with the synthetic resin.

Next, after curing the synthetic resin with which the cavities are filled, the movable molds 100, 200, 300, 400 are separated. Thus, as shown in FIG. 9C, the substrate 25 is integrally molded with the elastic wires 27, 28, 29, 30.

When the substrate 25 is molded with resin in this manner, the rear ends 47, 48, 49, 50 are formed in the four corners of the substrate 25 by the synthetic resin with which the depressions 203, 204 of the bottom movable mold 200 and the depressions (corresponding to the depressions 203, 204) of the top movable mold 100 shown in FIG. 4 are filled, and further the elastic wires 27, 28, 29, 30 are buried into these rear ends 47, 48, 49, 50 and are integrated.

Further, as shown in FIG. 9B, long lengths of the projection portions 31, 33, 32, 34 are molded in the four corners of the substrate 25 by the synthetic resin with which the depressions 105, 106 formed in the top movable mold 100 and the depressions 205, 206 formed in the bottom movable mold 200 are filled.

Furthermore, as shown in FIGS. 9A and 9B, the depression 105 is filled with the synthetic resin in a state that the elastic wire 27 is fitted into the slit groove 109 of the line projection 107 of the top movable mold 100 and the depression 105 is blocked with the line projection 107 and the regulating projection 304 of the left movable mold 300. As a result of this, as shown in FIG. 9C, the depression stepped portion 35 opposed to the projection portion 31 and the gap 39 defined by the projection portion 31 and the depression stepped portion 35 are formed in the substrate 25 and further, the elastic wire 27 is provided within the gap 39 with the elastic wire floated.

Also, the residual projection portions 32, 33, 34 and the depression stepped portions 35, 36, 37, 38 are formed in like manner, and the elastic wires 28, 29, 30 are provided within the gaps 40, 41, 42 with the elastic wires floated, respectively.

Next, the gaps 39, 40, 41, 42 are filled with the ultraviolet cure resins 43, 44, 45, 46 acting as a damping material to the resins. The narrow gaps 39, 40, 41, 42 which are defined by the projection portions 31, 32, 33, 34 and the depression stepped portions 35, 36, 37, 38 and interpose the elastic wires 27, 28, 29, 30 are filled with the ultraviolet cure resins 43, 44, 45, 46, so that surface tension occurs. As a result of that, even when filling of the liquid ultraviolet cure resins 43, 44, 45, 46 is performed, the resins are cured without liquid sagging out of the gaps 39, 40, 41, 42 due to the occurrence of the surface tension.

Then, as shown in FIG. 8A, after forming the intermediate product by cutting the predetermined portion of the lead frames 500, 600, the lens driving apparatus is completed by mounting the magnetic circuit unit while mounting the objective lens 52 in the lens holder 26 of the intermediate product.

Subsequently, by repeating the manufacturing steps described above, it is intended to continuously manufacture a plurality of the lens driving apparatus.

According to the embodiment thus, as shown in FIGS. 1 and 4, the column-shaped projection portions 31, 32, 33, 34 are integrally molded in the four corners of the substrate 25, and the gaps 39, 40, 41, 42 formed between the projection portions and the depression stepped portions 35, 36, 37, 38 opposed to these projection portions 31, 32, 33, 34 are filled with the ultraviolet cure resins 43, 44, 45, 46 to cure the resins in a state of cantilevering the elastic wires 27, 28, 29, 30, so that the so-called liquid sagging of the ultraviolet cure-resins 43, 44, 45, 46 can be prevented.

Also, the gaps 39, 40, 41, 42 for filling of the ultraviolet cure resins 43, 44, 45, 46 are formed by integrally molding the column-shaped projection portions 31, 32, 33, 34 with the substrate 25 using the movable molds 100, 200, 300, 400, so that the conventional opposed pieces 12, 13 are eliminated. As a result of this, the number of manufacturing steps as well as the number of parts can be reduced. Further, miniaturization and weight reduction of the lens driving apparatus can be achieved.

Incidentally, the case that the column-shaped projection portions 31, 32, 33, 34 are integrally molded in the four corners of the substrate 25 and the elastic wires 27, 28, 29, 30 are fastened using the ultraviolet cure resins 43, 44, 45, 46 has been described, but column-shaped projection portions similar to the column-shaped projection portions 31, 32, 33, 34 may be integrally molded in four corners of the lens holder 26 and gaps formed between their projection portions and a body portion of the lens holder 26 may be filled with the ultraviolet cure resins to cure the resins in a state of cantilevering the top ends of the elastic wires 27, 28, 29, 30.

That is, by molding the lens holder 26 with resin using a mold for lens holder which includes the depressions 105, 106, 203, 204, 205, 206, the slit grooves 109, 110, 209, 210, and the line projections 107, 108, 207, 208 provided in the movable molds 100, 200, and the plate-shaped regulating projections 304, 305, 404, 408 and the depression notches 307, 407 provided in the movable molds 300, 400 as shown in FIG. 4, the elastic wires 27, 28, 29, 30 may be fixed in the lens holder 26 and further the gaps maybe filled with the ultraviolet cure resins. According to such a configuration, the elastic wires 27, 28, 29, 30 can be damped by the ultraviolet cure resins filled in the side of the lens holder 26.

Also, the elastic wires 27, 28, 29, 30 may be damped by performing the filling of the ultraviolet cure resins in both of the lens holder 26 and the substrate 25.

Further, the ultraviolet cure resins are used as a damping material in the embodiment, but other cure resins, for example, thermoplastic resins may be used.

According to the invention as described above, when a substrate or a lens holder is molded with resin, gaps are integrally molded in a base of the substrate or a base of the lens holder and also, elastic wires are integrated with the base and further, the elastic wires are surrounded with a damping material by filling these gaps with the damping material, so that the number of parts and the number of manufacturing steps can be reduced while preventing liquid sagging of the damping material.

What is claimed is:

1. A lens driving apparatus comprising:
a lens holder for holding an objective lens, and a substrate which supports said lens holder through elastic members and is molded with resin, wherein
said substrate is integrally molded with resin, and
said elastic members are integrally supported in the substrate in the case of the resin molding and are provided within gaps molded in said substrate with the gaps formed when said substrate is integrally molded and are buried in a damping material with which the gaps are filled.

2. The apparatus as claimed in claim 1, wherein the damping material is substantially held within the gaps via surface tension of the damping material.

3. The apparatus as claimed in claim 1, wherein at least one of said gaps is disposed between a first portion of said substrate and a second portion of said substrate when viewed along a tracking direction of said objective lens.

4. A lens driving apparatus comprising:
a lens holder for holding an objective lens, and
a substrate which supports said lens holder through elastic members and is molded with resin, wherein
said elastic members are integrally supported in the substrate in the case of the resin molding and are provided within gaps molded in said substrate with the gaps ranging to said integrally supported portions and are buried in a damping material with which the gaps are filled, and
the gaps are formed by depression portions and projection portions opposed one another molded in the proximity of said elastic members in the case of the resin molding.

5. A lens driving apparatus comprising:
a lens holder which holds an objective lens and is molded with resin, and
a substrate for supporting said lens holder through elastic members, wherein
said elastic members are integrally supported in said lens holder in the case of the resin molding and are provided within gaps molded in said lens holder with the gaps ranging to said integrally supported portions and are buried in a damping material with which the gaps are filled, and
the gaps are formed by depression portions and projection portions opposed one another molded in the proximity of said elastic members in the case of the resin molding.

6. The lens driving apparatus as claimed in claim 4 or 5, wherein
the depression portions and projection portions are molded in a long shape along a longitudinal direction of said elastic members.

7. The lens driving apparatus as claimed in claim 6, wherein
the depression portions and projection portions are molded by a mold for resin molding.

8. The lens driving apparatus as claimed in claim 4 or 5, wherein said damping material is ultraviolet cure resin.

9. A lens driving apparatus comprising:
a lens holder which holds an objective lens and is molded with resin, and
a substrate for supporting said lens holder through elastic members, wherein
said lens holder is integrally molded with resin, and
said elastic members are integrally supported in said lens holder in the case of the resin molding and are provided within gaps molded in said lens holder with the gaps formed when said substrate is integrally molded and are buried in a damping material with which the gaps are filled.

10. The apparatus as claimed in claim 9, wherein the damping material is substantially held within the gaps via surface tension of the damping material.

11. The apparatus as claimed in claim 9, wherein at least one of said gaps is disposed between a first portion of said substrate and a second portion of said substrate when viewed along a tracking direction of said objective lens.

12. A manufacturing method of a lens driving apparatus, said lens driving apparatus comprising:
   a lens holder for holding an objective lens, and
   a substrate for supporting said lens holder through elastic members,
said manufacturing method comprising:
   a first step of fitting said elastic members into a mold on which cavities having a first depression for molding a base of said substrate, a projection adjacent to the first depression, and a second depression adjacent to said projection and partially ranging to the first depression are formed with said elastic members stretched between said projection and said ranging portion of the first and second depressions,
   a second step of integrally supporting said elastic members in the base molded by the synthetic resin with which the ranging portion is filled and providing said elastic members within gaps formed by said projection between the first and second depressions by filling the cavities of said mold with synthetic resin, and
   a third step of burying said elastic members in a damping material by filling the gaps with said damping material after separating said mold.

13. A manufacturing method of a lens driving apparatus, said lens driving apparatus comprising:
   a lens holder for holding an objective lens, and
   a substrate for supporting said lens holder through elastic members,
said manufacturing method comprising:
   a first step of fitting said elastic members into a mold on which cavities having a first depression for molding a base of said lens holder, a projection adjacent to the first depression, and a second depression adjacent to the projection and partially ranging to the first depression are formed with said elastic members stretched between said projection and the ranging portion of the first and second depressions,
   a second step of integrally supporting said elastic members in the base molded by the synthetic resin with which the ranging portion is filled and providing said elastic members within gaps formed by said projection between the first and second depressions by filling the cavities of said mold with synthetic resin, and
   a third step of burying the elastic members in a damping material by filling the gaps with said damping material after separating said mold.

14. The manufacturing method of a lens driving apparatus as claimed in claim 12 or 13, wherein
   ultraviolet cure resin is filled as said damping material in the third step.

15. A manufacturing apparatus of a lens driving apparatus, said lens driving apparatus comprising:
   a lens holder for holding an objective lens, and
   a substrate for supporting said lens holder through elastic members,
said manufacturing apparatus comprising:
   a mold on which cavities having a first depression for molding a base of said substrate, a projection adjacent to the first depression, and a second depression adjacent to the projection and partially ranging to the first depression are formed, wherein
   by filling the cavities of the mold with synthetic resin with said elastic members stretched between the projection of the mold and the ranging portion of the first and second depressions, said elastic members are supported in the base molded by the synthetic resin with which the ranging portion is filled and are provided within gaps formed by the projection, and thereafter are buried in a damping material by filling the gaps with said damping material.

16. A manufacturing apparatus of a lens driving apparatus, said lens driving apparatus comprising:
   a lens holder for holding an objective lens, and
   a substrate for supporting said lens holder through elastic members,
said manufacturing apparatus comprising:
   a mold on which cavities having a first depression for molding a base of said lens holder, a projection adjacent to the first depression, and a second depression adjacent to the projection and partially ranging to the first depression are formed, wherein
   by filling the cavities of the mold with synthetic resin with said elastic members stretched between the projection of the mold and the ranging portion of the first and second depressions, said elastic members are supported in the base molded by the synthetic resin with which the ranging portion is filled and are provided within gaps formed by the projection, and thereafter are buried in a damping material by filling the gaps with said damping material.

17. The manufacturing apparatus of a lens driving apparatus as claimed in claim 15 or 16, wherein
   said mold comprises:
      a first and a second molds forming the first and second depressions and a first projection by mutual combinations, and
      a third mold having a first regulating projection inserted in contact with the top of the first projection while being inserted between said first and said second molds and blocking the opening end of the second depression, and
   said projection molded in the second depression by filling the cavities with said synthetic resin is formed opposed to the base through a gap formed by said first projection and said first regulating projection.

18. A manufacturing apparatus of a lens driving apparatus, said lens driving apparatus comprising:
   a lens holder for holding an objective lens, and
   a substrate for supporting said lens holder through elastic members,
said manufacturing apparatus comprising:
   a mold comprising:
      first cavities for resin molding having a first depression for molding a base of the substrate, a first projection adjacent to the first depression, and a second depression adjacent to the first projection and partially ranging to the first depression, and
      second cavities for resin molding having a third depression for molding a base of the lens holder, a second projection adjacent to the third depression, and a fourth depression adjacent to the second projection and partially ranging to the third depression, wherein
   by filling the first and second cavities for resin molding with synthetic resin with said elastic members stretched between the first projection of said mold and the ranging portion of the first and second depressions and between said second projection and the ranging portion of the third and fourth depressions, said elastic members are supported in both the bases of said substrate and said lens holder molded by the synthetic resin with which the ranging portion is filled and are provided within each gap formed by the first and second projections, and thereafter are buried in a damping material by filling each the gap with said damping material.

19. A lens driving apparatus comprising:

a lens holder adapted to hold an objective lens, a substrate which supports said lens holder through elastic members and which is molded with resin; and a damping material, wherein:
   said elastic members are integrally supported in the substrate,
   the substrate, which is molded with said resin, comprises gaps,
   said elastic members are respectively located within said gaps,
   said damping material is disposed within said gaps around said elastic members, and
   at least one of said gaps is disposed between a first portion of said substrate and a second portion of said substrate when viewed along a tracking direction of said objective lens.

* * * * *